(12) United States Patent
Smedresman et al.

(10) Patent No.: US 12,276,347 B1
(45) Date of Patent: Apr. 15, 2025

(54) MASS AND/OR SPRING ASSISTED RUPTURE DISC

(71) Applicant: Zulu Pods, Inc., Davie, FL (US)

(72) Inventors: Adam Smedresman, Davie, FL (US); Todd M. Currier, Davie, FL (US)

(*) Notice: Subject to any disclaimer, the term of this patent is extended or adjusted under 35 U.S.C. 154(b) by 0 days.

(21) Appl. No.: 18/530,004

(22) Filed: Dec. 5, 2023

(51) Int. Cl.
| | | |
|---|---|---|
| F16K 17/16 | (2006.01) | |
| F16K 17/194 | (2006.01) | |
| F16K 17/196 | (2006.01) | |
| F16K 17/30 | (2006.01) | |

(52) U.S. Cl.
CPC ............ *F16K 17/16* (2013.01); *F16K 17/194* (2013.01); *F16K 17/196* (2013.01); *F16K 17/30* (2013.01)

(58) Field of Classification Search
CPC ...... F16K 17/16; F16K 17/194; F16K 17/196; F16K 17/30
USPC ....................... 137/68.23, 68.19, 68.28, 68.29
See application file for complete search history.

(56) References Cited

U.S. PATENT DOCUMENTS

| | | | | | |
|---|---|---|---|---|---|
| 3,623,495 | A | * | 11/1971 | Erb .......................... | F16K 17/16 137/69 |
| 3,743,318 | A | * | 7/1973 | Yamaguchi ............ | B60R 21/268 137/68.13 |
| 3,827,449 | A | * | 8/1974 | Gurizzan ................. | F16K 13/04 222/397 |
| 3,845,878 | A | * | 11/1974 | Carlson ............... | F16K 17/1626 137/68.28 |
| 3,908,684 | A | * | 9/1975 | Short ................... | F16K 17/1613 137/68.29 |
| 4,119,236 | A | * | 10/1978 | Shaw ................... | F16K 17/1613 137/68.24 |
| 4,137,930 | A | * | 2/1979 | Scholle .................... | F16L 37/04 137/614.04 |
| 4,232,698 | A | * | 11/1980 | Hosterman ........... | G01L 9/0072 137/557 |
| 4,566,476 | A | * | 1/1986 | Fallon .................... | B67D 1/125 137/71 |
| 4,590,957 | A | * | 5/1986 | McFarlane .............. | F16K 17/16 220/89.2 |
| 4,937,019 | A | * | 6/1990 | Scott ...................... | F17C 13/123 261/DIG. 7 |
| 5,197,718 | A | * | 3/1993 | Wallis ...................... | F16F 13/00 267/64.11 |
| 5,632,505 | A | * | 5/1997 | Saccone .................. | F17C 13/06 137/68.28 |
| 5,832,947 | A | * | 11/1998 | Niemczyk ............... | F16K 17/16 137/68.21 |
| 6,240,948 | B1 | * | 6/2001 | Hansen, III ......... | F16K 17/1606 137/68.28 |

(Continued)

*Primary Examiner* — Minh Q Le
(74) *Attorney, Agent, or Firm* — Sanchelima & Associates, P.A.; Jesus Sanchelima; Christian Sanchelima

(57) ABSTRACT

A mass and/or spring assisted rupture disc including a holder assembly, a rupture disc assembly having a membrane that is operatively connected with a mass and/or a spring to assist its rupture. The mass and/or spring assisted rupture disc is designed with a mass distribution that uses acceleration forces, which are present in many engineering applications, to aid in the opening. This allows a rupture disc that is more compact and more sensitive than a conventional rupture disc in applications with significant acceleration levels. The added force of both the mass and the spring makes the membrane more sensitive and tunable to rupture across a wider range of pressures.

18 Claims, 13 Drawing Sheets

(56) References Cited

U.S. PATENT DOCUMENTS

| | | | | |
|---|---|---|---|---|
| 7,204,265 B2 * | 4/2007 | Zikeli | ............... | F16L 57/00 |
| | | | | 137/68.25 |
| 7,721,915 B2 * | 5/2010 | Bock | ............... | B60R 21/272 |
| | | | | 280/736 |
| 7,748,398 B2 * | 7/2010 | Miller | ............... | B65D 77/06 |
| | | | | 220/89.3 |
| 7,950,409 B2 | 5/2011 | Stokes et al. | | |
| 9,896,904 B2 | 2/2018 | Ringgenberg | | |
| 2016/0040796 A1 * | 2/2016 | Omesti | ............ | F16K 37/0058 |
| | | | | 137/511 |
| 2018/0313455 A1 * | 11/2018 | Said | ............... | F16K 17/1606 |

* cited by examiner

MASS AND/OR SPRING ASSISTED RUPTURE DISC

BACKGROUND OF THE INVENTION

1. Field of the Invention

The present invention relates to a rupture disc and, more particularly, to a mass and spring assisted rupture disc that increases the sensibility of the membrane to open constantly with low pressure level across it. The present invention provides tunable controlled properties to address problems over a wide gamut of mechanical applications.

2. Description of the Related Art

Several designs for rupture discs have been developed in the past. However, none of them have integrated a mass and spring-assisted rupture disc attached to a container, which in turn may store a fluid and/or a gas. The mass and spring-assisted rupture disc utilizes the acceleration inside the rotating container or the linear acceleration the disc may be exposed to plus the centrifugal fluid force plus any gas pre-pressure to burst the disc. This approach increases the stress on the rupture disc, allowing it to open at low predetermined pressures. This application is versatile and can be beneficial for various purposes, including airbag activation and more.

Applicant believes that a related reference corresponding to U.S. Pat. No. 7,950,409 discloses an activation rupture disc unit. The rupture disc unit is capable of withstanding higher back pressure than its burst activation pressure. A tapered, self-releasing solid plug is positioned in and conforms to the tapered portion of the passage. The plug has a curved surface conforming to and positioned in a full supporting relationship to the central section of the rupture disc. The plug is of sufficient mass to prevent rupture of the central section of the disc under a back pressure substantially greater than the activation pressure of the disc.

Applicant believes that another related reference corresponds to U.S. Pat. No. 9,896,904 which discloses a rupture disc assembly. The rupture disc assembly having a secondary seal positioned over the coupling area between the rupture disc and the tool housing. The secondary seal may be, for example, sealing tape, an O-ring, liquid sealant, metallic sealing tape, etc., or a combination of two or more of these elements. The rupture disc may be held by a Smalley® snap ring/retainer ring in combination with a spring. None of these references, however, describe an enclosure housing a mass connected to the membrane of a rupture disc. In this configuration, the centrifugal and/or linear forces experienced during operation are utilized to enhance the pressure sensitivity of the rupture disc. Additionally, the distal end of the mass may be linked to a pre-loaded spring, offering a membrane that is more responsive and adjustable to rupture over a broader range of pressures.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a mass and/or spring assisted rupture disc that uses a mass and/or a spring to add forces to a rupture disc, allowing the rupture disc to open consistently with a low-pressure level across it. In various embodiments, the present invention can include a mass attached to the membrane of the rupture disc, a spring attached thereto as well, or a concatenation of both elements to tune the behavior of the rupture disc depending on operation requirements.

It is another object of the present invention to provide a tunable rupture disc that can be designed to fit within small packaging volumes.

It is another object of this invention to provide a mass and spring assisted rupture disc which is externally or internally added in a container for pressure relief therein.

It is another object of the present invention to provide a tunable rupture disc that takes advantage of acceleration forces present in mechanical components (in operating conditions) to make the membrane more sensitive and aid in its opening.

It is another object of this invention to provide a mass and spring assisted rupture disc that includes a mass and a spring which can be customized in an offset configuration to allow rupture of the rupture disc in a wider range of pressures. The mass and spring assisted rupture disk is also customized in weight of the mass and spring compression.

It is still another object of the present invention to provide a mass and spring assisted rupture disc, wherein the spring can be set for adding predetermined levels of stress to the rupture disc.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 6 shows a cross sectional view of another variation of the present invention 200, wherein the container with chamber 290a includes a spring 280 that is supported by a support 296a which horizontally extends from a lateral side of the inner walls of the container 290a.

DETAILED DESCRIPTION OF THE EMBODIMENTS OF THE INVENTION

Figure 1A:
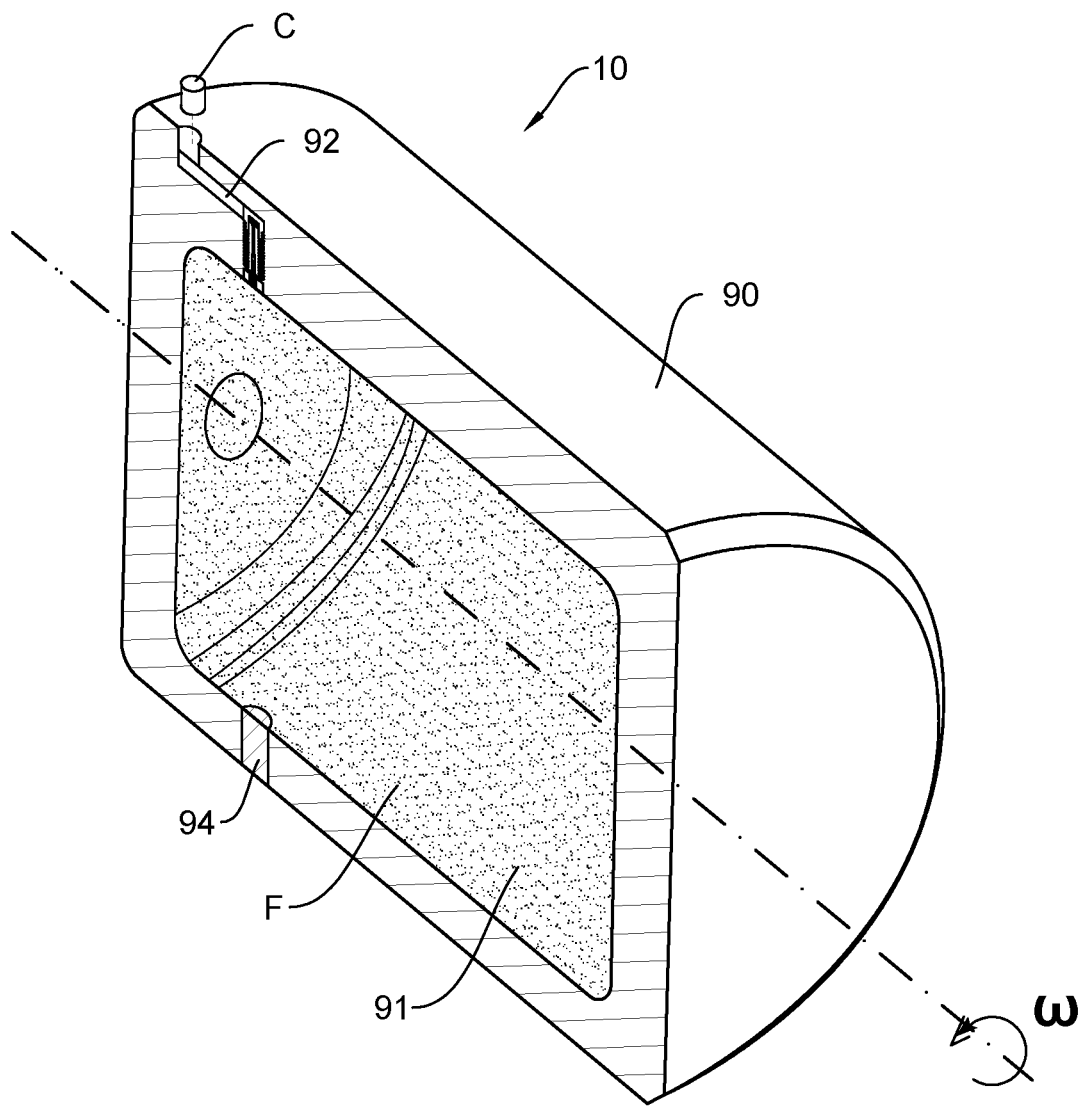
FIG. 1A is a cross sectional view of an exemplary embodiment of the present invention.

Referring now to the drawings, where the present invention is generally referred to with numeral 10, it can be observed that it basically includes a holder assembly 20, a rupture disc 40, a mass assembly 60, a spring 80, and a container 90. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention as illustrated in the exemplary embodiments of FIG. 1A-1D, show the holder, rupture disc, mass, and spring assemblies (20, 40, 60, 80) mounted into an inner-cross section of the lateral wall of the container 90. The container 90 as set forth herein may be any suitable mechanical component that needs pressure protection as known in prior art, be it (for explanatory purposes), a dispenser, a relief valve, a piping system, or the like. Furthermore, the container 90 may be subject to lineal and/or rotational force in operating conditions. In the present exemplary embodiment, the container 90 may include an inner reservoir 91 to store substances, such as fluids or the like, therein. For explanatory purposes, the container 90 may be a cylindrical dispenser with a mating portion (not explicitly shown in the figures) to receive the assemblies (20, 40, 60, 80) therein. The container 90, in various embodiments, may display maintained strength and creep rupture properties at high temperatures. The container 90 may be made using additive/subtractive manufacturing. The container 90 may be made of alloy steel, carbon steel, stainless steel, tool steel, brass, bronze, iron, aluminum, ceramics, composite materials, engineering materials, or any other suitable material from the art. The container 90 described is provided for illustrative purposes, and it is important to recognize that any other appropriate enclosure can be employed while remaining within the scope of the present invention.

Referring now to the embodiment of FIG. 1A, it can be appreciated that the container 90 may include an inner channel 92 that may lead to the external surface of the container 90. In this exemplary configuration, the present invention may introduce a plug 94, enabling the installation of assemblies (20, 40, 60, 80) from the opposite side of the container 90. Once the assemblies are installed within the inner cross section of the container's wall, the plug 94 may be sealed. Additionally, in this exemplary embodiment, the present invention may include a cap C to seal the distal end of the inner channel 92 as depicted. It may be suitable for assemblies 20, 40, 60, 80 to be flush with the wall of the container.

Figure 1B:
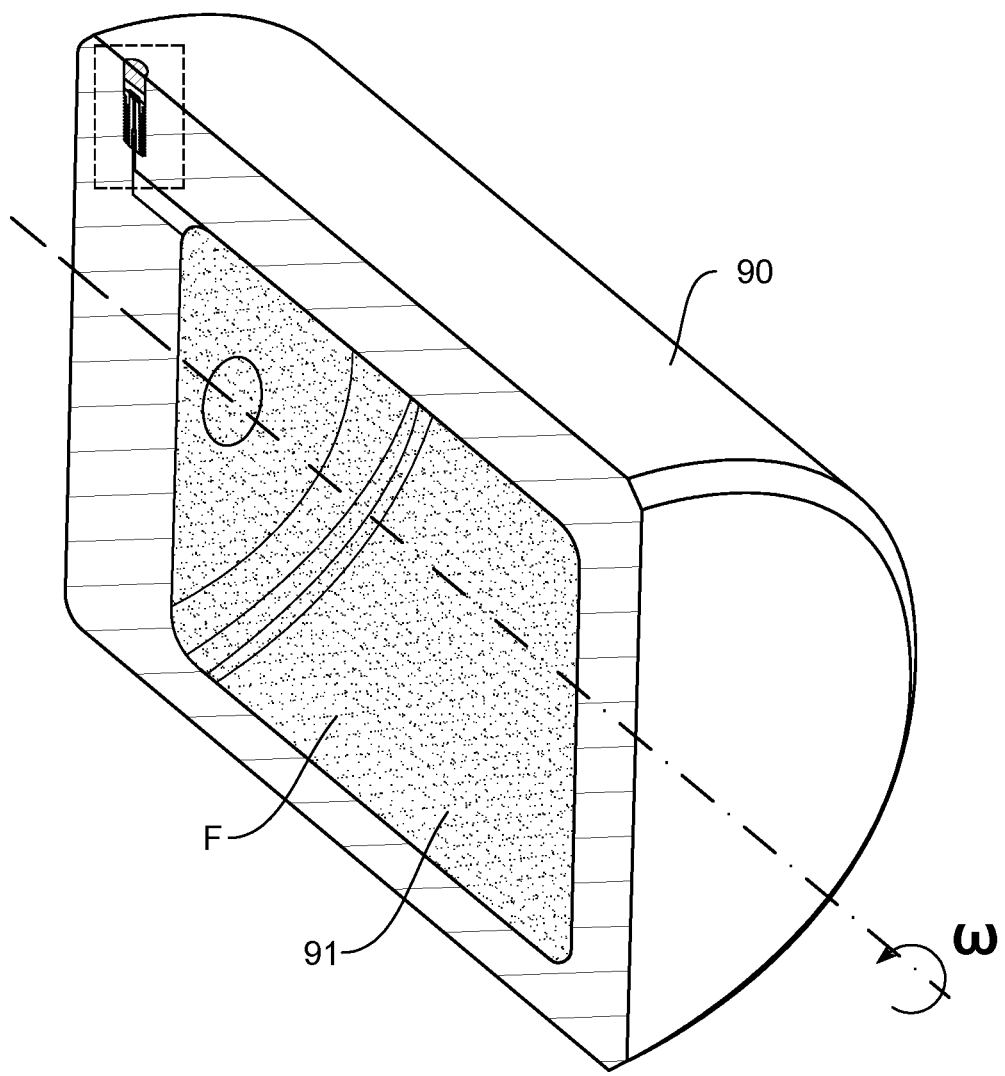
FIG. 1B is a cross sectional view of an exemplary embodiment of the present invention.

The embodiment depicted in FIG. 1B showcases an exemplary configuration where the assemblies are situated within a cross section at one distal end of the container 90, rather than within its lateral wall. In this embodiment, the inner channel 92 may extend from the reservoir to the assemblies (20, 40, 60, 80), facilitating the expulsion of fluid through them. It is important to note that the assemblies (20, 40, 60, 80) can either be an integral part of the container 90 or a modular element attached to it. In a preferable embodiment, the assemblies (20, 40, 60, 80) may be screwed in the container.

Figure 1C:
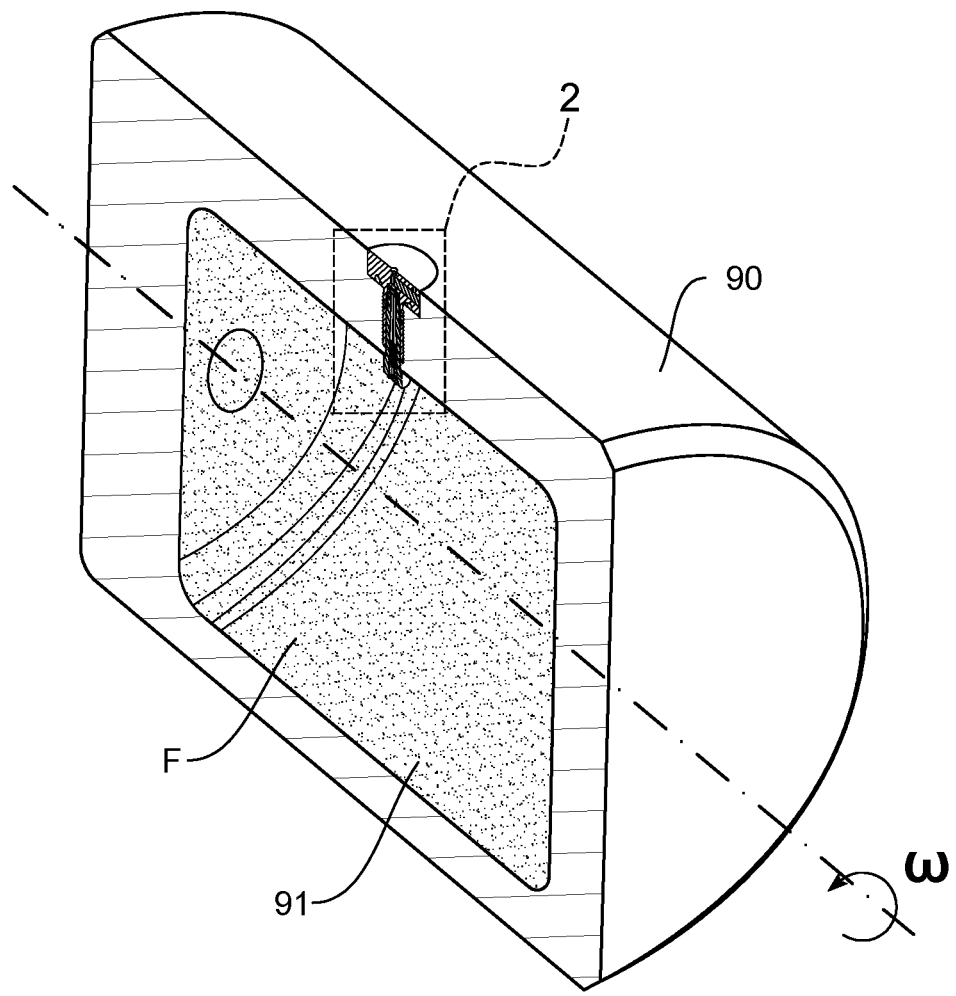
FIG. 1C is a cross sectional view of an exemplary embodiment of the present invention.
Figure 1D:
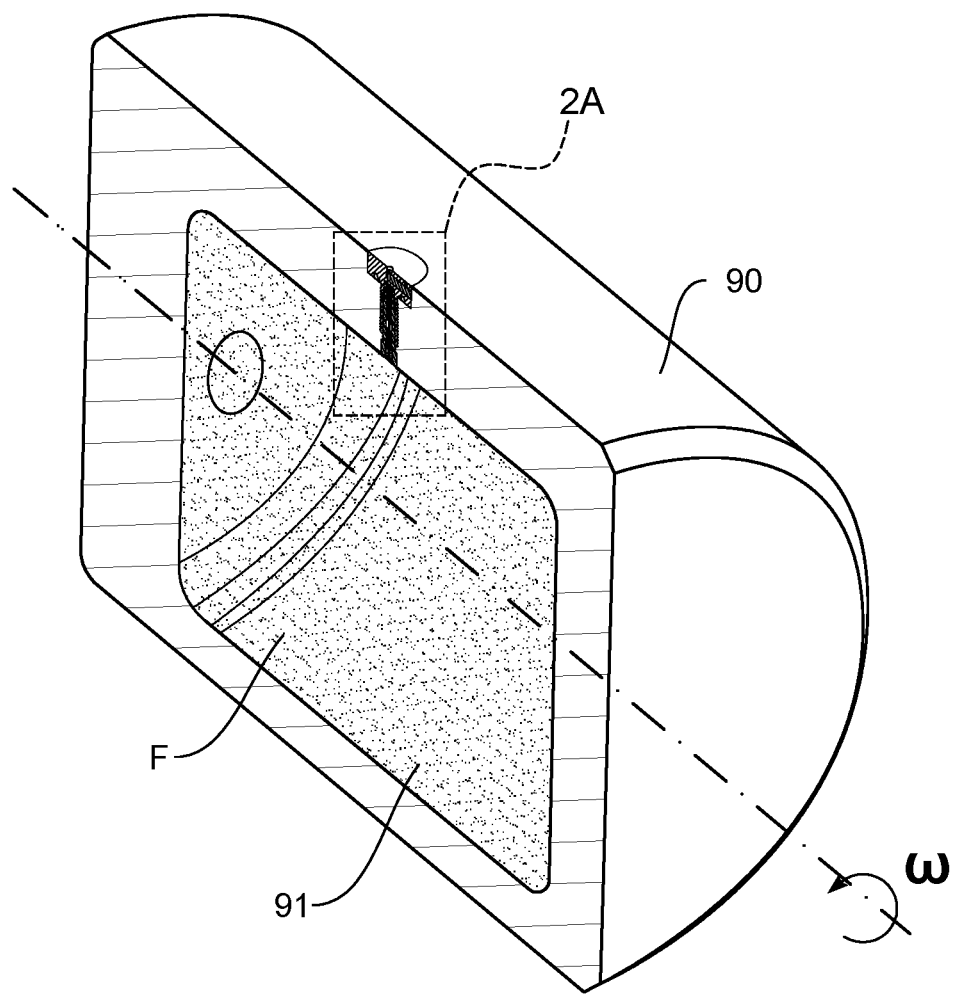
FIG. 1D is a cross sectional view of an exemplary embodiment of the present invention.
Figure 2:
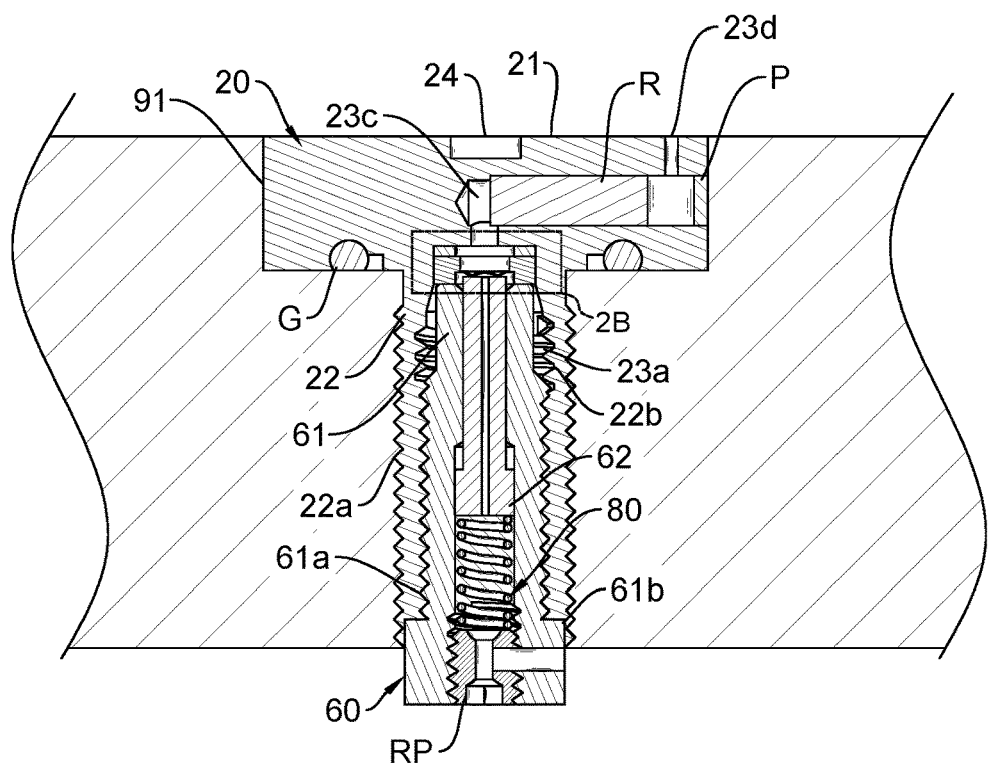
FIG. 2 is an enlarged cross-sectional view of the mass and spring assembly according to one exemplary embodiment of the present invention.
Figure 2A:
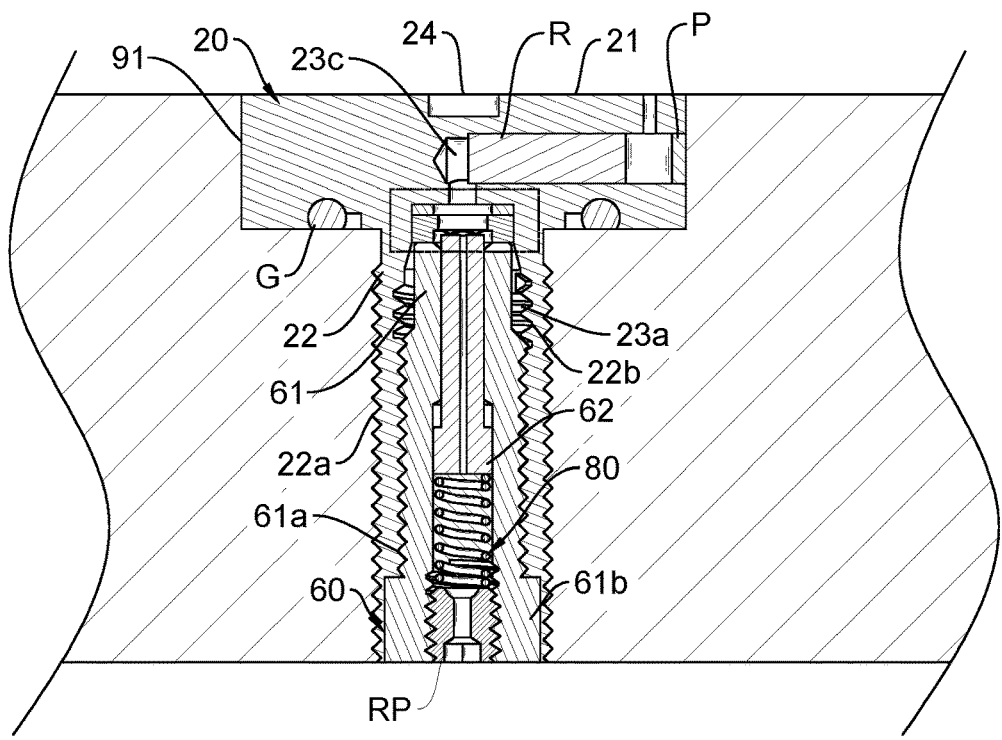
FIG. 2A is an enlarged cross-sectional view of the mass and spring assembly according to another exemplary embodiment of the present invention.
Figure 3:
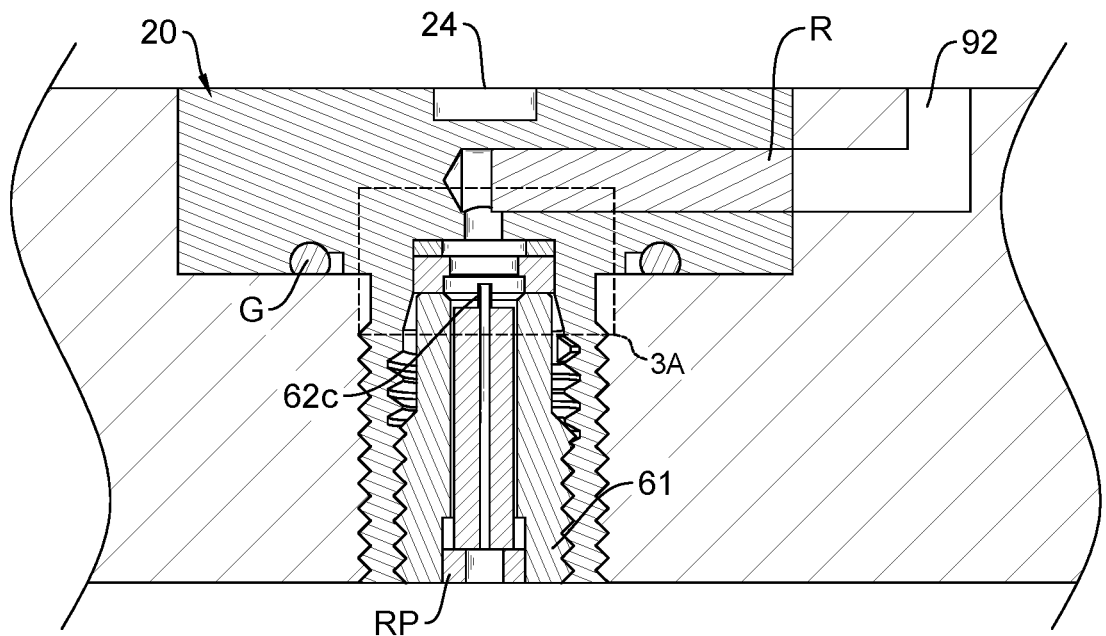
FIG. 3 is an enlarged cross-sectional view of the mass and spring assembly according to another exemplary embodiment of the present invention.
Figure 3A:
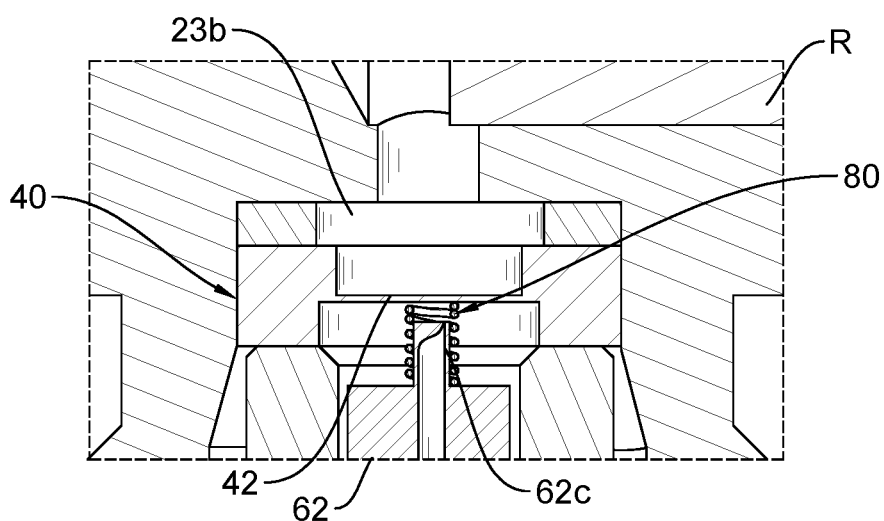
FIG. 3A is an enlarged view of the rupture disc and the nose of the mass pin according to another exemplary embodiment of the present invention.

The embodiments depicted in FIG. 1C-1D illustrate an exemplary configuration of the present invention, in which elements 20, 40, 60, 80 are housed (or partially housed as shown in FIG. 1C) within the inner cross section of the container's wall. In these embodiments Referring now to the exemplary FIG. 2-2A, which present a cross-sectional view of the assemblies (20, 40, 60, 80), it can be appreciated that the holder assembly 20 may encompass the rupture disc, the mass and the spring assemblies (40, 60, 80). The holder assembly 20 may be a monolithic element comprising a top portion 21 and a bottom portion 22. Wherein the bottom portion 22 may be received by the container 90. In this embodiment, the holder assembly 20 may be coupled in a bore 91 disposed in the lateral wall of the container 90. It may be suitable for the container to include However, in other exemplary embodiments, the holder assembly 20 may be located in other sections of the dispenser based on operational requirements. Both the top portion 21 and the bottom portion 22 may be partially hollow. The bottom portion 22 may exhibit a threaded outer surface 22a and an inner mating thread 22b, as shown in FIG. 2. It may be suitable for the lateral wall to include an inner mating thread, enabling the holder to be screwed into it. The top portion 21 may exhibit a disassembly feature 24. The disassembly feature 24 may be prominently located at the center of the top portion 21. The purpose of the disassembly feature 24 is to provide a mating surface for a corresponding tool or mechanism to engage with and facilitate the removal of the holder assembly 20 from the container 90. The disassembly feature 24 may be a snap-fit connection, a quick release lever, or any other suitable mechanism as known in the art. Shape-wise, the holder assembly 20 may feature a T-shape, with the bottom portion 21 acting as the vertical element intersecting with the top portion 21, representing the horizontal element. Internally, the holder assembly 20 may include a continuous channel traversing both the top and bottom portions (21, 22). For descriptive purposes, the channel may be divided into three portions: a first portion 23a, a second portion 23b, and a third portion 23c. In the exemplary embodiment of FIG. 2, the first and second portions of the channel (23a, 23b) may be collinear and may extend vertically inside the bottom portion 22, while the third portion of the channel 23c may extend inside the top portion 21 towards its periphery. The trajectory of the channel may vary as long as it presents a continuous venting path through the holder assembly 20. In a suitable embodiment, the channel may have a variable diameter. As shown in FIG. 2, the inner mating thread is located in the first portion of the channel 23a. The second portion of the channel 23b, situated between the first 23a and the third 23c portion of the channel, may have a smaller diameter to compress the flowing fluid and increase the flow rate. However, the configuration of the channel can be adjusted to meet different operational requirements. It may be suitable to include a restrictor R inside the third portion of the channel 23c as best illustrated in FIGS. 2, 2A and 3. In one exemplary embodiment the restrictor R may be a component that may be designed to be easily attached within the third portion of the channel 23c (or any other portion of the channel, if required) in a modular fashion, thereby defining a restrictor R modularly attached in the dispenser. The modular mounting approach allows for convenient installation, removal, replacement or customization of the restrictor R. In other exemplary embodiments, the restrictor R may be monolithically formed in the channel. In one embodiment, the restrictor R may be a porous media which may offer a structure with customized permeability that permits to further restrict the flow of oil. Other restrictors, such as high resistance flow restrictors known in the art, viscous restrictors or inertial loss restrictors, may be used for the described purposes. In one exemplary embodiment, the channel may further include an outward exit port 23d. Said exit port 23d can be either collinear or perpendicular to the third portion 23c. Notwithstanding the direction of the exit port 23d, a plug P may be used to close the passage. As can be appreciated in FIG. 2-3, various elements such as the rupture disc 40, mass assembly 60, spring, gasket G, flow restrictor R, can be disposed along different portions of the channel. FIG. 2 also illustrates a gasket G placed on the bottom surface of the top portion, serving as a mechanical sealing device to create a tight seal between the container 90 and the holder assembly 20. The gasket G is a mechanical sealing device used to create a tight seal between two or more components. It is typically made of flexible materials, such as rubber or silicone, and is placed between mating surfaces to prevent leakage or the ingress of contaminants. In different embodiments, the gasket G can be replaced with a different type of seal, including a welded, brazed, or soldered connections, tapered sealing threads, metal to metal sealing features, or adhesive. The threaded portion of the holder assembly may fit snugly into the corresponding mating portion of the container 90, thereby creating a secure and stable connection between the two parts.

Figure 2B:
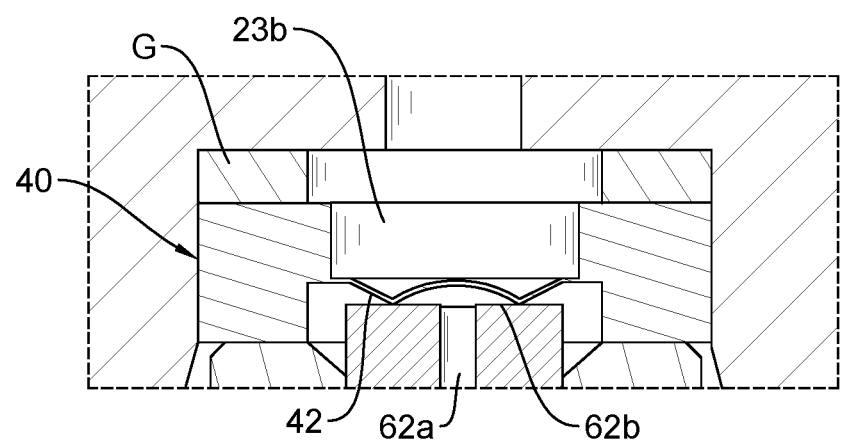
FIG. 2B is an enlarged view of the rupture disc and the nose of the mass pin according to one exemplary embodiment of the present invention.

The rupture disc assembly 40, also termed as rupture disc, may be located inside the second portion of the channel 23b as shown in FIG. 2-2B. Wherein a rupture disc, also known as a bursting disc or pressure safety disc, is a device used to protect equipment or systems from overpressure. It is designed to rupture or burst at a specific pressure threshold, allowing the release of pressure and preventing potential damage or failure of the system. In a suitable embodiment, the rupture disc consists of a thin, circular disc made from materials such as metal or composite materials. The rupture disc may be engineered to have a specific burst pressure rating, which may be the pressure at which it will rupture. The burst pressure may be predetermined and calibrated based on the desired level of protection for the system. In different embodiments, the rupture disc may be a reverse buckling rupture disc, a forward-acting rupture disc, a composite rupture disc, a scored rupture disc, or any other suitable variation thereof. It is important to note that the specific type of rupture disc used may depend on the requirements of the application, including pressure ratings, temperature ranges, and the like. In different embodiments, the rupture disc 40 may be a one-piece element or multi-piece. An additional mechanical sealing, be it gasket G for illustrative purposes, may be implemented together with the rupture disc 40. As shown in the exemplary FIG. 2-3, the gasket G may be disposed on top of the rupture disk 40. The purpose of combining the rupture disc 40 and the gasket G (or any other suitable seal) may be to provide a reliable and efficient pressure relief mechanism. The rupture disc 40 may serve as a sacrificial barrier designed to rupture at a specific pressure threshold. The gasket G, on the other hand, may be used to create a secure and leak-tight seal between two mating surfaces, ensuring the integrity of the system under normal operating conditions. By incorporating both components, the rupture disc 40 may provide pressure relief when needed, while the gasket G may maintain the sealing capability of the system when the disc is intact. In other embodiments, the gasket G may be welded thereat or even replaced by any other element that may serve the same purpose, such as an O-ring. It is essential to emphasize that while gasket G is utilized in a preferred embodiment, it should not be regarded as a restrictive choice. As previously explained, alternative seal types may be incorporated without straying from the intended scope of the described invention.

The mass assembly 60 may include a housing 61 and a mass pin 62. The housing 61 may be configured to be screwed into the mating thread 22b of the bottom portion 22 as depicted in FIG. 2. This is achieved by incorporating a housing thread 61a on the housing 61 that matches and interlocks with the mating thread 22b. The housing 61 may be volumetrically suitable to fit inside the bottom portion 22. Additionally, it is important for the housing 61 to have a centrally positioned opening or channel that extends lengthwise within its inner cross section. In the embodiment of FIG. 2, it is shown the housing 61 including a head 61b, also referred to as head portion, at a bottom distal end which may not be enclosed by the bottom portion 22. The head 61b may provide a surface for applying torque during installation or removal thereof within the housing 61. The housing 61 may be hollow to receive the mass pin 62 and the spring assembly 80 therein. In the embodiment illustrated in FIG. 2, the housing 61 may include a mating thread in an inner cross section of the head portion 61b. It may also be possible for housing 61 to have a varying inner diameter to accommodate the spring 80 therein. The top distal end of the housing 61 may be proximal to the rupture disc 40. The membrane 42 of the rupture disk 40 may align the central opening of the housing 61 as depicted in FIG. 2, the foregoing allows the mass pin 62 to directly interact with the rupture disc 40. In one exemplary embodiment (as shown in FIG. 2) in which the head 61b may extend past the inner surface of the lateral wall, the head 61b may further include a side hole to create a way for the fluid to escape as it empties close to the inner wall. On the other hand, the embodiment of FIG. 2, showcases a configuration in which the head 61b is flush with the inner wall.

Figure 2C:
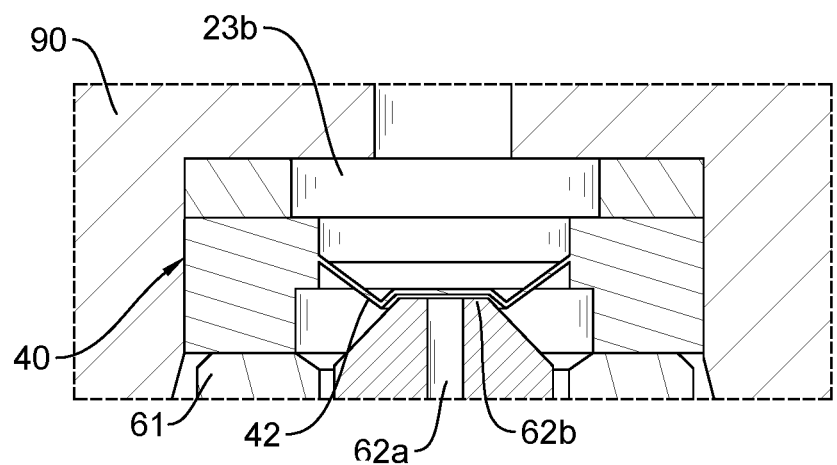
FIG. 2C is an enlarged view of the rupture disc and the nose of the mass pin according to another exemplary embodiment of the present invention.

In various embodiments the mass pin 62 may be a separate component attached to the rupture disc 40 or may be added as part of a monolithic structure of the rupture disc 40, to define a mass-assisted rupture disc. The mass pin 62 in its various embodiments, may cooperate with the membrane 42 of the rupture disc 40 to make it more sensitive and tunable to rupture across a wider range of pressures by adding a tensile and/or bending load thereto. As mentioned above, depending on the application, the container 90 together with the rupture disc 40 may be subject to different operating conditions causing the mass-assisted rupture disc to experience accelerations (linear, rotational or other). The container 90 may store fluid F and/or gas under pressure. For the invention to properly operate, the fluid F and gas need to be under sufficient pressure such that the fluid force due to its acceleration plus any gas pre-pressure is high enough to initiate rupture when combined with the mass assist. The mass-assisted rupture disc takes advantage of present acceleration forces to aid in the opening of the rupture disc 40. Thereby, presenting an improved and more sensitive membrane 42 to be used in applications with significant acceleration levels. The centrifugal fluid force plus any gas (e.g. nitrogen) pre-pressure plus the mass assist combine to burst the disc. To achieve the foregoing, the mass pin 62 may add an additional force that is directly proportional to the product of the mass and the experienced acceleration (Newton's second law) that is intended to aid in the opening. As presented throughout exemplary FIG. 2-3, the mass pin 62 may be disposed inside the housing 61. The mass pin 62 may have an elongated geometry to conform with the interior of the housing 61. Additionally, the mass pin 62 may be able to slide inside the housing 61. As appreciated, the mass pin 62 may include a mass inner channel 62a which ensures that fluid flows easily after the rupture disc 40 is burst, and that the center of the disc is pressurized pre-burst. The mass pin 62 may include a nose 62b at a top distal end, which may be the specific part of the mass that interfaces with the rupture disc 40. Exemplary FIG. 2B-2C, show enlarged views to better appreciate the nose 62b interacting with the membrane 42 of the rupture disc 40. In FIG. 2B, it is shown a flat nose 62b, which may load rupture disc 40 (be it a buckling style rupture disc for exemplary purposes) differently, as the nose would only be in partial contact with the membrane 42 of the rupture disk 40. Exemplary embodiment of FIG. 2C shows the nose having a tapered shape to add the above mentioned tensile load in different areas of the rupture disk 40. Additionally, in FIG. 2C, one can appreciate the gap around the pin mass 62, which may allow it to slide easily under centrifugal force and for fluid to flow around it, pressurizing the rupture disc 40.

In another exemplary embodiment, the rupture disc 40 together with the mass pin 62 may be assisted by a preloaded spring 80, which adds additional force to assist in opening, as illustrated in illustrative FIG. 2. The spring 80 as hitherto explained may be a modular component that may be included and attached inside the housing 61 to tune the sensibility of the rupture disk 40. In another exemplary embodiment, the spring 80 may be a monolithic component formed together with the mass pin 62. In various embodiments, the spring 80 may be designed to meet a desired spring coefficient that suits different industrial applications to add a predefined force that may aid in rupturing the membrane 42 under defined conditions. On the other hand, spring parameters may be empirically defined. In the embodiment shown in FIG. 2, the spring 80 may be located at a bottommost end of the mass pin 62 opposite to the nose 62b. A retaining piece RP may be screwed into the bottom end of the housing 61 to hold the spring 80 and mass pin 62 in place. In other embodiments, wherein the housing 61 may not exhibit a mating thread at the bottom end, the retaining piece RP may be press-fit, or the like. In one exemplary embodiment, the retaining piece RP may be a vented set screw, which is a type of screw that has a small hole drilled through its threaded portion. This hole allows for the release of trapped air or fluids that may be present in a confined space.

Referring now to exemplary FIG. 3 which shows an alternate embodiment of the mass pin 62 which replaces the nose 62b with a needle 62c. The needle would be an extension of the mass inner channel 62a. During operation, the needle 62c may punctuate the rupture disc 40. In the present embodiment, no preloading spring would be incorporated at the bottom of the mass pin 62 as in the embodiment of FIG. 2. Additionally, the housing 61 may not exhibit the mating thread, thus the retaining piece RP would be fit in by other means. FIG. 3, shows a variation of the embodiment having the needle 62c, wherein a spring 80, be it a light compressive spring for illustrative purposes, may be located in between the needle 62c and the rupture disc 40, the spring may extend downwards to the horizontal face of the mass pin 62. The light compressive spring may be sized to prevent the needle from puncturing and contacting the rupture disc during storage. However, during operation this spring may be easily overcome by centrifugal force of the mass, allowing contact and puncturing. The exemplary embodiment of FIG. 3 presents a configuration in which the inner channel 92 aligns with the third portion of the channel 23c, creating an exit port for the fluid to be expelled through it. The embodiments in which the exit port formed as part of the holder assembly 20 (FIG. 2) or formed in the inner cross section of the wall (inner channel 92, FIG. 3) should not be regarded as mutually exclusive, as both create a pathway for the fluid to be expelled from the container 90.

As can be appreciated through FIG. 1A-3A, the vented design helps prevent pressure build-up or fluid entrapment, making it useful in applications where pressure relief or fluid drainage is necessary.

While the embodiments shown in FIG. 1A-3A depict refined versions of the present invention, it is important to note that the subsequent embodiments as shown in FIG. 4-11 showcase an iteration of the same invention. These later figures demonstrate a more basic representation. Although the features and functionality remain fundamentally the same, the level of detail displayed in FIG. 1A-3A should be considered the preferred embodiment. The purpose of including the basic embodiments is to provide another view of the foundational principles and functionality that would enable the present invention.

Figure 4:
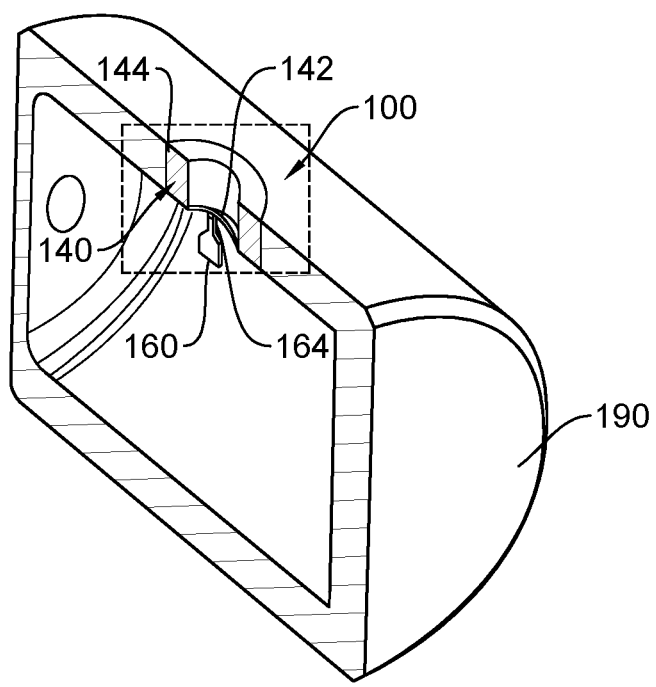
FIG. 4 represents an isometric broken view of an exemplary embodiment 100 of the present invention showing a variation of the container 190 with the membrane 142 of the rupture disc assembly 140 having a mass 162 attached therein.
Figure 4A:
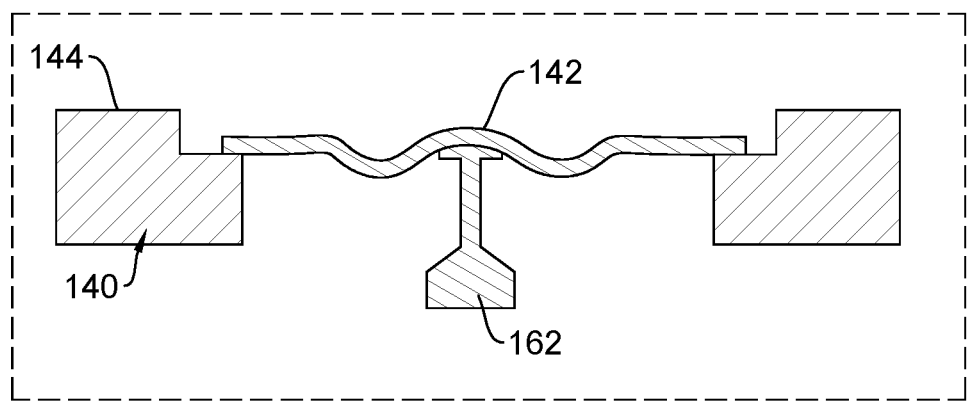
FIG. 4A shows an enlarged sectional view of the mass 162 attached to the membrane 142 of the rupture disc assembly 140 in an exemplary embodiment of the present invention.

In exemplary embodiment 100, the rupture disc assembly 140, as illustrated in FIG. 4-4A is operatively connected with the container 190 and includes a membrane 142 secured by means of a rupture disc holder 144. The rupture disc holder 144, as known in the art, is designed to create a seal while clamping the membrane 142 in place. The size and geometry of the rupture disc holder 144 may be customized to accommodate different applications. The rupture disc holder 144 may be a bolted type, a screw type, a union type, a pretorqueable, a double disc assembly, a viscous tee, or any other suitable type from the art. The membrane 142 is a one-time-use element that bursts/fails at a predetermined differential pressure, either positive or vacuum. The membrane 142 may be designed with any suitable shape as known in the art to accommodate the geometry of the rupture disc holder 144 and/or the geometry of the container 144. Case dependent, the membrane 142 may be formed by one layer or multiple layers. In exemplary embodiments, the membrane 142 may be domed or flat, where each configuration is intended for different applications. Based on the operating conditions of the system that may cooperate with the present invention, the membrane 142 may be domed towards the process (defining a reverse-acting configuration) or may be domed away from the process (defining a forward-acting configuration). Materials used to manufacture the membrane 142 may vary from carbon steel, stainless steel, graphite, and other suitable and specialized materials such as Inconel, Hastelloy, Tantalum, or any other suitable material for these purposes as known in the art. It should be understood that the aforementioned features of the membrane 142 and the rupture disc holder 144 are herein included for illustrative purposes and does not limit the present invention to solely include them since those are components widely known in the art. Moreover, through the incorporation of additional structural elements such as mass and/or spring, which interact with the membrane in various applications, the present invention described herein aims to introduce a unique enhancement that encompasses multiple embodiments with practical utility in diverse industrial settings.

Figure 5:
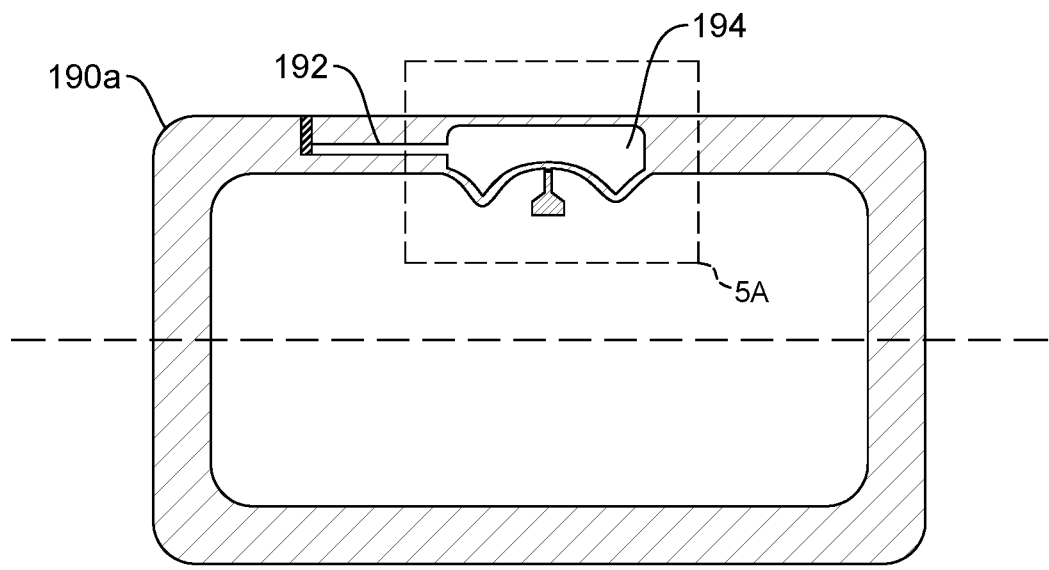
FIG. 5 illustrates a cross sectional view of the container 190 having internal channels 196. The channels 196 connect with the rupture disc assembly 40 which is inserted into the walls of the container.
Figure 5A:
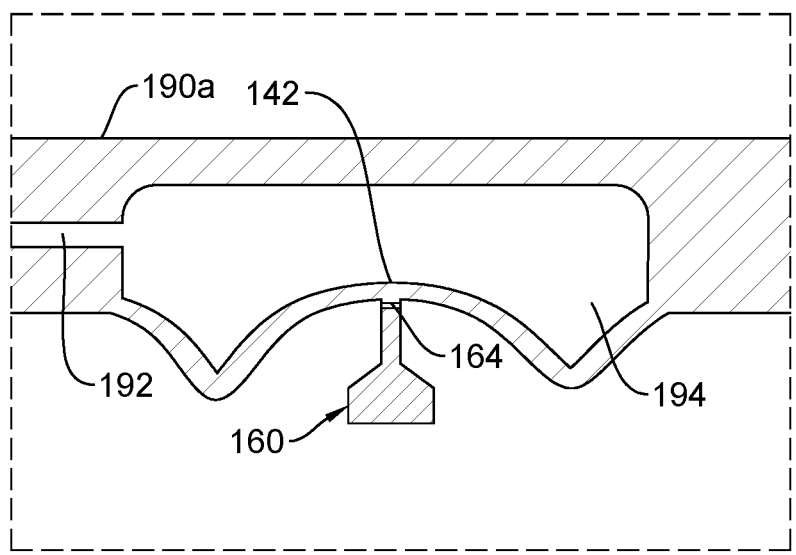
FIG. 5A illustrates a representation of a broken view of the insertion of the rupture disk assembly 140 inserted in the walls of the container.

As illustrated in FIG. 4-5A, in various embodiments the mass 160 also referred to as mass assembly, may be a separate component attached to the membrane or may be added as part of a monolithic structure of the membrane 142, hereinafter referred to as monolithic mass 162 to define a mass-assisted rupture disc. Both, the mass 160 and the monolithic mass 162 cooperate with the membrane 142 to make it more sensitive and tunable to rupture across a wider range of pressures by adding a tensile load thereto. As mentioned above, depending on the application, the container 190 together with the rupture disc assembly 140 may be subject to different operating conditions causing the mass-assisted rupture disc to experience accelerations (linear, rotational or other). The mass-assisted rupture disc takes advantage of present acceleration force to aid in the opening of the rupture disc assembly 140. Thereby, presenting an improved and more sensitive membrane to be used in applications with significant acceleration levels. To achieve the foregoing, both the mass 160 and the monolithic mass 162 add an additional force that is directly proportional to the product of the mass and the experienced acceleration (Newton's second law) that is intended to aid in the opening.

The mass 160, as shown in FIG. 1A, may be attached (welding, soldering, adhesives, fasteners, or the like) to the membrane 42 by an attachment interface 64. FIG. 1A may represent a reverse-acting configuration, as defined above, where a higher pressure is felt on the inside of the container 22. However, the configuration illustrated is for exemplary purposes, the mass assembly 160 may be attached to a flat membrane or to the membrane in forward-acting configuration. Additionally, the mass 160 may be incorporated to a composite rupture disc that may be made of multiple layers and/or suitable materials from the art. The disposition of the mass 160 attached thereon or monolithically incorporated (monolithic mass 162) can be analytically defined if some parameters are known, such as operating pressures, accelerations, tensile strength, desired rupture point, vacuum resistance, thickness, radius value, arch height, loading rate, or the like, to ensure a desired bursting performance. The disposition of the mass 160 on the membrane 142 may also be empirically defined. In another exemplary embodiment, the membrane 142 may be designed with the mass 160 to assist in bursting the rupture disc assembly 140 in both reverse and forwards direction of a bistable design.

Exemplary embodiment of FIG. 5-5A, present a structural variation of the container 190 where a chamber 192 is formed in an inner cross section, hereinafter referred to as container with wall chamber 190a. The chamber 192 may be sealed with the membrane 142 and the monolithic mass 162. The container with wall chamber 190a, in various embodiments, may be manufactured using additive/subtractive manufacturing. The present exemplary embodiment, the chamber 192 provides a relief space for the membrane 142 once it has buckled and/or burst inwards. FIG. 5 shows a center line intended to denote that the container with wall chamber 190a may rotate about it, thereby experiencing centrifugal accelerations.

Figure 6:
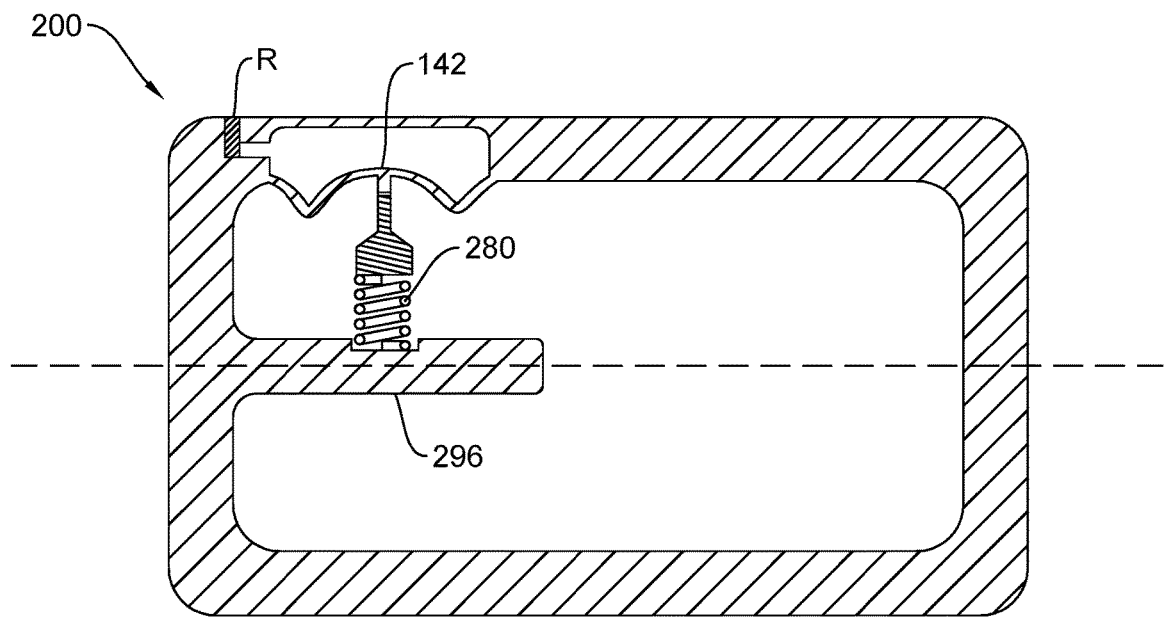
Figure 7:
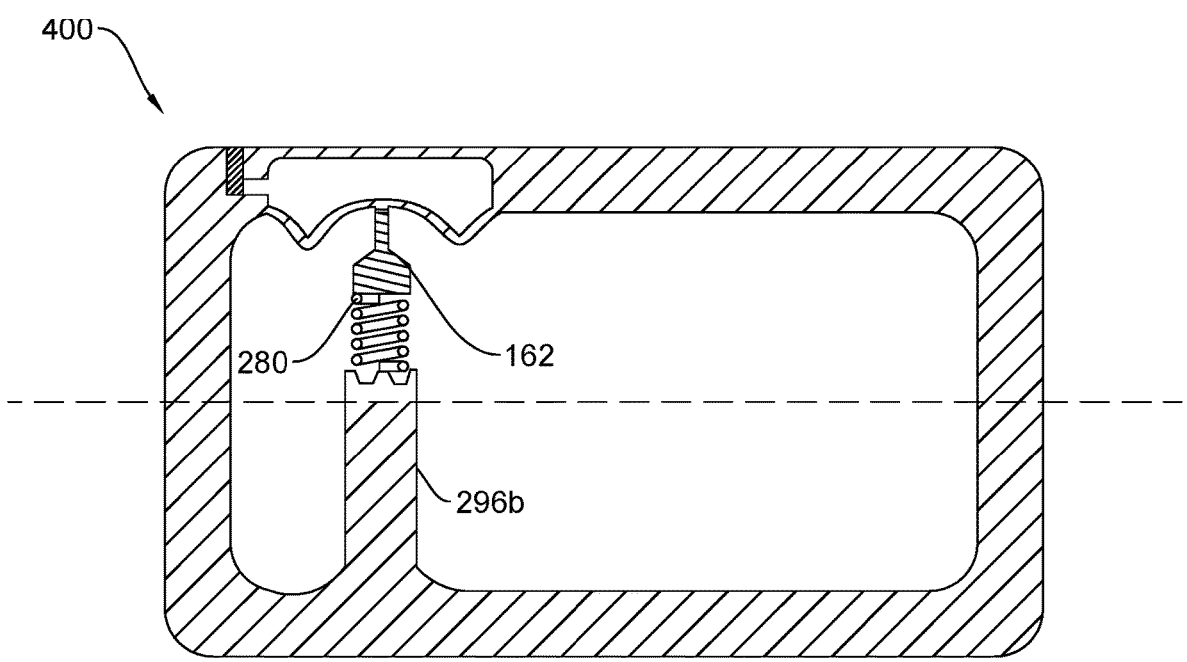
FIG. 7 depicts a cross sectional view of the container 290a having the spring 80 supported in a support 296b which vertically extends from a bottom inner wall thereof.

In another exemplary embodiment, the membrane 142 together with the mass 160 or the monolithic mass 162 may be assisted by the pre-loaded spring 280, which adds additional force to assist in opening, as illustrated in illustrative FIG. 6-7. To hold up the spring 280, the container with wall chamber 290a may include a horizontal support 296 (FIG. 6), or a vertical support 296b (FIG. 7). The support (296, 296b) may extend from the inner surface of the container's wall towards its interior by a predetermined distance that may be subject to the length of the spring 280. The spring 280 as hitherto explained may be a modular component that may be included and attached therein to tune the sensibility of the membrane 142. In another exemplary embodiment, the spring 180 can be a monolithic component, commonly known as the monolithic spring 182, which is formed together with either the container 290a or the membrane 142. This integrated design showcases the efficient utilization of space and simplifies the assembly process, offering enhanced functionality and performance. In various embodiments, the spring 280 may be designed to meet a desired spring coefficient that suits different industrial applications to add a predefined force that may aid in rupturing the membrane under defined conditions. On the other hand, spring parameters may be empirically defined.

Figure 8:
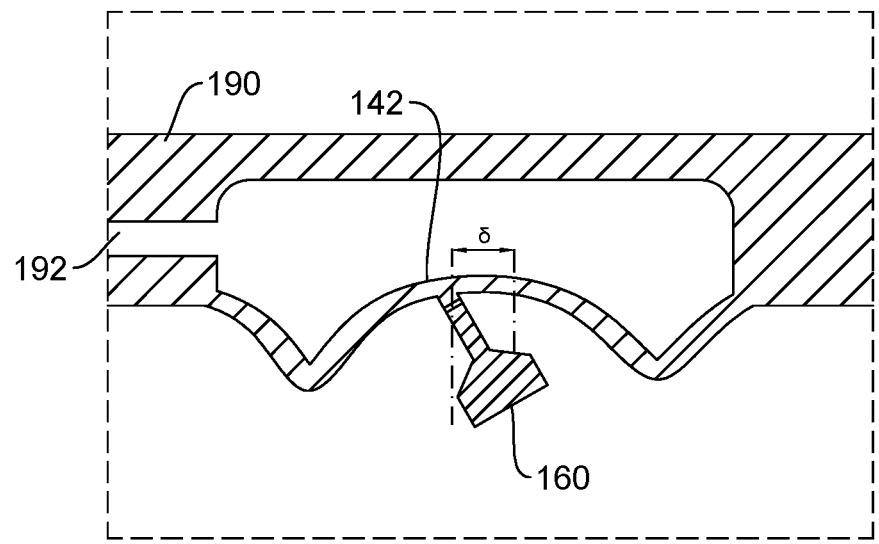
FIG. 8 shows an enlarged cross-sectional view of the container from exemplary embodiments 100, having the mass 160 in an offset configuration.
Figure 9:
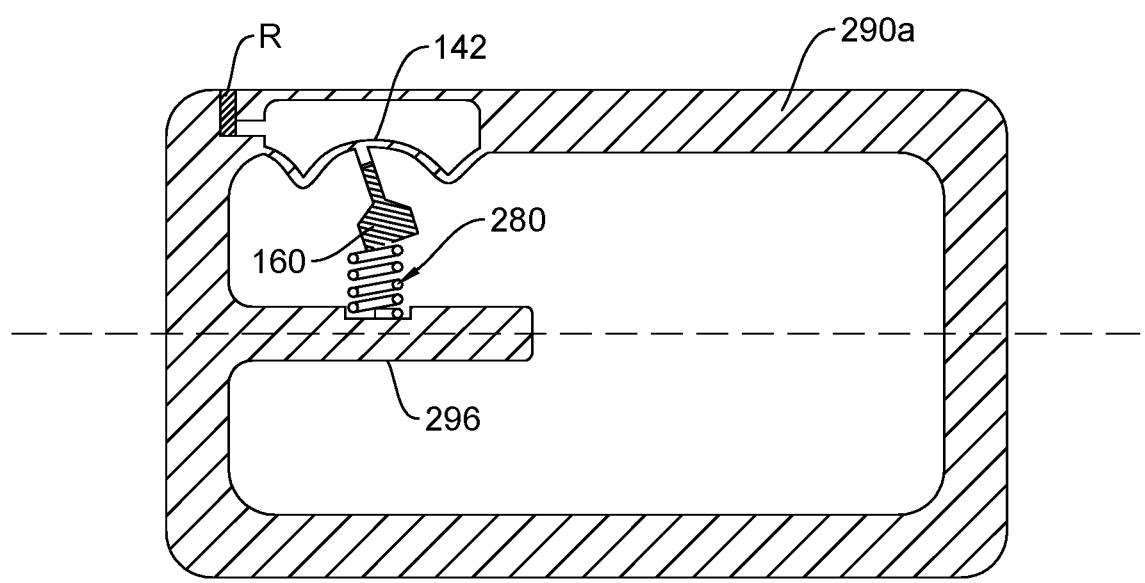
FIG. 9 illustrates a cross sectional view of the container 290 having the mass 260 and the spring 80 in an offset configuration.
Figure 10:
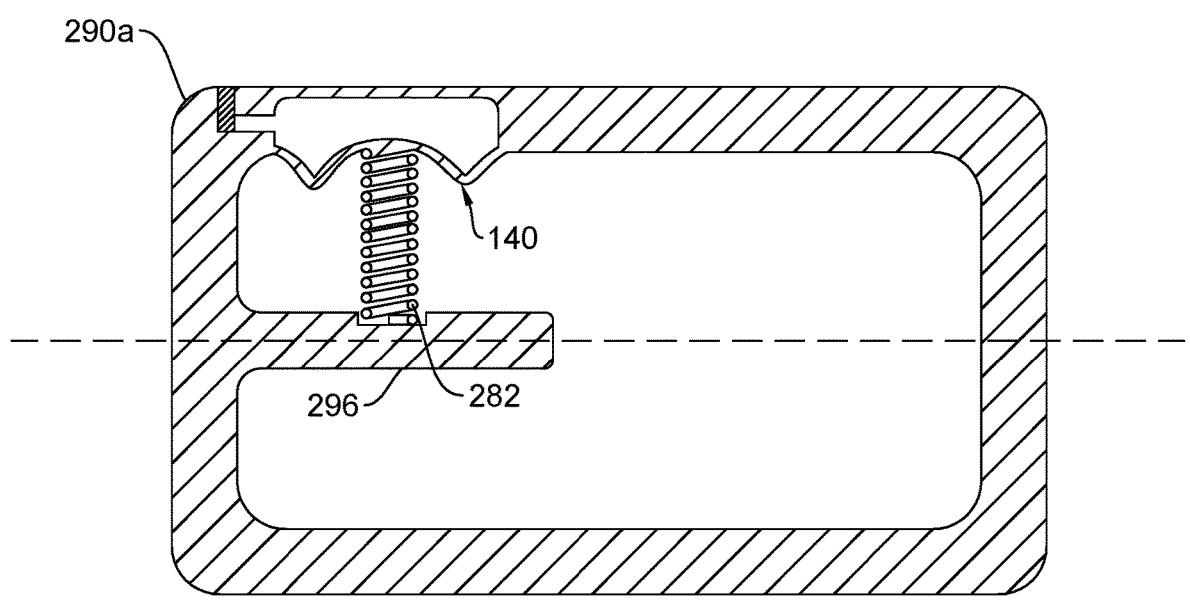
FIG. 10 is a cross-sectional view of the container 300 in an exemplary embodiment, where the spring 380 is integral to the structure.
Figure 11:
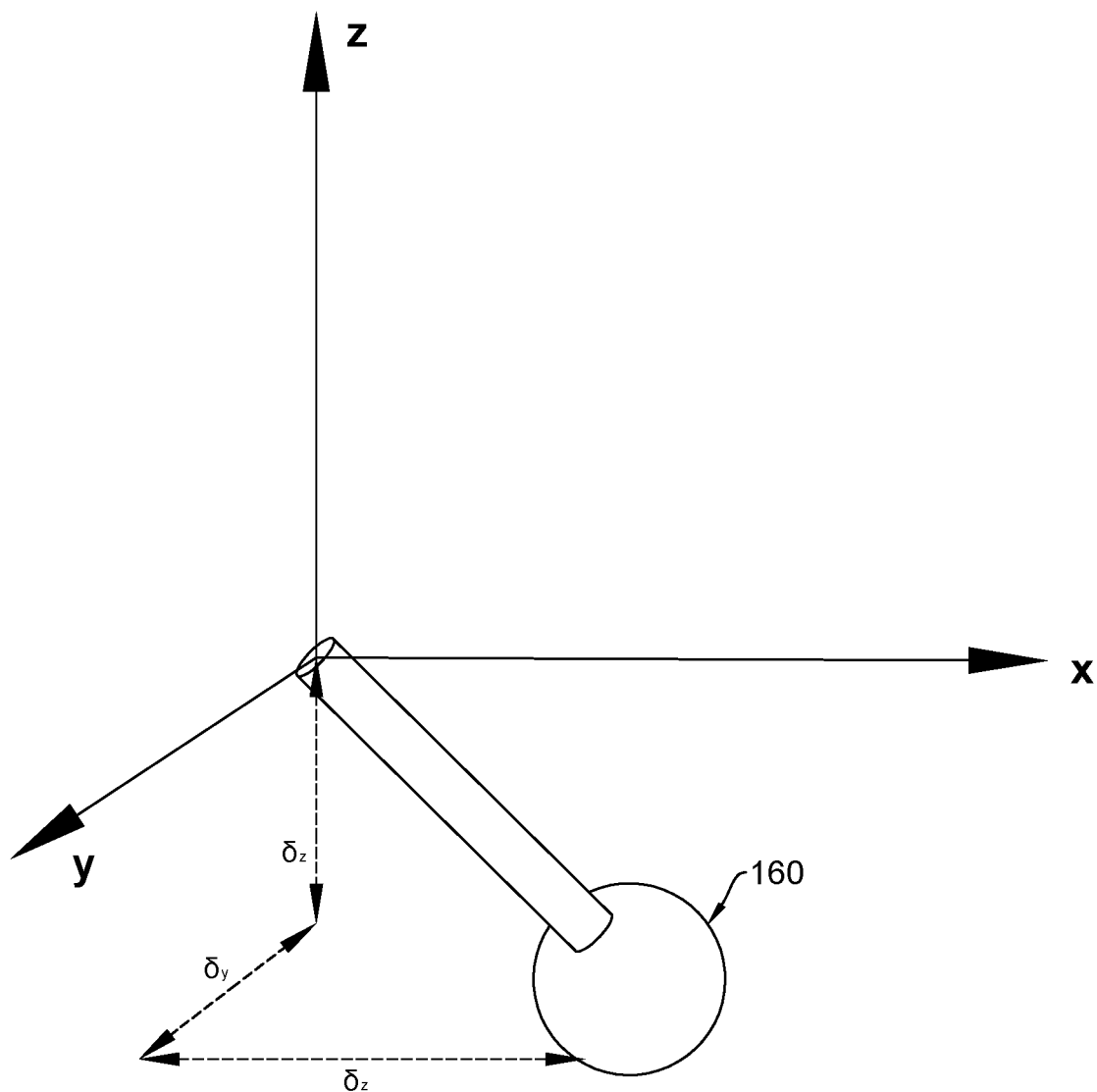
FIG. 11 is a representation of moment arm & as result of the offset configuration.

In another embodiment, the mass 160/monolithic mass 162 may be oriented to be offset from its elastic axis as illustrated in FIG. 8-9. In the exemplary embodiment herein described the point where the mass attaches or extrudes from the membrane 162 is offset from the center of gravity of the mass 160/monolithic mass 162. In the present embodiment the addition of inertial loads oriented in the vertical direction, as shown, there is a moment produced with a moment arm 8. The benefit of this exemplary configuration is that moment is a much more effective means of increasing stress in the membrane 142, as opposed to a purely tensile load. Furthermore, if more sensitive designs are required, the mass 160/monolithic mass 162 may be oriented such that it produces a combined state of stress. The combined state of stress may be produced by placing the center of gravity of the added mass (160, 162) offset from the elastic axis in multiple planes. FIG. 11 is an illustrative representation of the foregoing, where the mass is offset by $\delta_x$, $\delta_y$, and $\delta_z$, wherein each delta ($\delta$) represents a displacement from the center of the reference frame, be it the point where the mass attaches.

In a suitable exemplary embodiment, the added mass, be it the mass 160 or the monolithic mass 162, may be operatively connected with the spring 280 to define a mass and spring assisted rupture membrane/disc, as illustrated in FIGS. 6, 7 and 9. By combining the features of both the spring 280 and the mass (160, 162) it may be possible to increase the parameters that can be tuned to calibrate the present invention appropriately for desired applications. The mass and spring assisted rupture disc may include the mass 160/monolithic mass 162 in offset configuration as described above. In a suitable embodiment, the mass 160/monolithic mass 162 may be connected to the membrane 142 at a distal end and may interact with the spring 280 at an opposite distal end as illustrated. The sum of the forces exerted by both the mass 160 and the spring 180 on the membrane 142 may permit the rupture disc assembly 140 to burst under relatively low pressures.

While the embodiments depicted showcase variations in the level of detail and component configurations, it is important to note that all iterations described herein pertain to the same field of invention. At their core, each embodiment puts forth a rupture disc/membrane that has been improved through the addition of supplementary forces supplied by a mass and/or spring element. Although the components and arrangements may differ across embodiments, the underlying structure and functionality remains consistent. More specifically, the fundamental concept involves a basic rupture disc assembly with an integrated movable mass that interacts with and loads the rupture disc/membrane. The spring element simply serves as an additional force-supplying component that can be incorporated as needed. Ultimately, the numerous embodiments are intended to demonstrate the wide applicability of the mass/spring-assisted rupture disc. By revealing multiple potential arrangements and applications, the intent is to protect the intellectual property as broadly as possible, without limiting the scope of the invention to a single detailed iteration. Thus, while some embodiments offer more specific representations, all embodiments described encapsulate the foundational mechanical concepts and improvements underlying the present invention.

What is claimed is:

1. An assisted rupture disc assembly comprising:
    a rupture disc comprising a membrane;
    at least one assisting component operatively connected to said rupture disc, wherein said at least one assisting component is selected from the group consisting of: a mass assembly, a spring, and combinations thereof;
    wherein said at least one assisting component is configured to add a supplemental force to said rupture disc to provide improved sensitivity and a wider range of responsive pressures.

2. The assisted rupture disc assembly of claim 1, wherein said at least one assisting component comprises a mass assembly, wherein said mass assembly is attached or integrally formed with said membrane.

3. The assisted rupture disc assembly of claim 2, wherein said mass assembly further comprises a mass pin configured to directly contact and load said membrane.

4. The assisted rupture disc assembly of claim 1, wherein said at least one assisting component comprises a spring positioned to exert a force on said membrane.

5. The assisted rupture disc assembly of claim 1, wherein said rupture disc and said at least one assisting component are configured for exposure to accelerative forces, such that said accelerative forces contribute to rupture of said membrane.

6. An assisted rupture disc, comprising:
    a rupture disc assembly including a membrane;
    a mass assembly and/or a spring operatively linked to a bottom surface of said membrane thereby defining said assisted rupture disc;
    said assisted rupture disc is disposed within a cross section of a container, said container having an inner reservoir to store a fluid therein; and
    said container being subject to accelerations that causes the mass assembly and/or said spring to increase pressure sensibility of said membrane.

7. The assisted rupture disc set forth in claim 6, further includes a holder to secure the rupture disc and the mass and/or the spring in place within the cross-section of the container.

8. The assisted rupture disc set forth in claim 6, wherein said membrane is a one-time-use element that bursts at predetermined differential pressures, either positive or vacuum.

9. The assisted rupture disc set forth in claim 6, wherein said mass adds a tensile and/or bending load to said membrane when hanging along its elastic axis.

10. An assisted rupture disc, comprising:
    a container having a lateral wall surrounding an inner reservoir, said container further including distal ends, said container stores a fluid and/or a pressured gas therein;
    a holder assembly is coupled inside a bore of said container, said bore is shaped to receive and conform with the geometry of the holder assembly, said holder assembly is formed by a top portion and a bottom portion, wherein the top portion is flush with an outer surface of said container, a seal is located between horizontal portion of the bore and a bottom surface of the top portion to create a seal; said bottom portion extends radially from said bottom surface of said top portion toward the reservoir, said holder assembly having a continuous channel traversing said bottom portion and said top portion; a rupture disc is disposed within a second portion of said continuous channel, wherein another seal is positioned on top of said rupture disc; and
    a mass assembly attached within a first portion of the continuous channel of the holder assembly, said mass assembly having a distal end linked to said rupture disc to aid in the opening of the rupture disc, thereby defining said assisted rupture disc.

11. The assisted rupture disc set forth in claim 10, wherein said bottom portion has a threaded outer surface to be screwed within the bore, said bottom portion further includes an inner mating thread.

12. The assisted rupture disc set forth in claim 10, wherein a restrictor is disposed within a third portion of the continuous channel, said third portion is located in a cross section of the top portion.

13. The assisted rupture disc set forth in claim 11, wherein said mass assembly further includes a housing and a mass pin;
    said housing is screwed into the inner mating thread of said bottom portion, said housing having a central positioned opening that extends lengthwise within its inner cross section, wherein when said mass assembly is attached inside the holder assembly said central positioned opening is proximal to said rupture disc, in doing so a membrane of the rupture disc aligns with said central positioned opening, the housing further includes a head portion located at a bottom distal end thereof; and
    said mass pin is disposed within said central positioned opening, wherein said mass pin has an elongated geometry that conforms with the central positioned opening allowing said mass pin to slide inside the housing, said mass pin further includes a mass inner channel, said mass inner channel and the central positioned opening are concentric, said mass pin having a nose at a top distal end linked to the membrane of said rupture disc.

14. The assisted rupture disc set forth in claim 13, wherein a spring is incorporated between the membrane and the nose or at the bottommost end of the mass pin.

15. The assisted rupture disc set forth in claim 13, wherein a retaining piece is attached to the head, said retaining piece has a vent drilled through its body that is concentric with both the mass inner channel and the central positioned opening.

16. The assisted rupture disc set forth in claim 14, wherein said container is subject to accelerations that cause the mass assembly and said spring to increase pressure sensibility of said membrane.

17. The assisted rupture disc set forth in claim 15, wherein the acceleration experienced by the container generates a fluid force that contributes to bursting the membrane.

18. The assisted rupture disc set forth in claim 17, wherein the pressured gas stored in the container contributes to bursting the membrane.

* * * * *